M. OSNOS.
DYNAMO ELECTRIC MACHINE.
APPLICATION FILED MAR. 8, 1913.
1,157,325.
Patented Oct. 19, 1915.
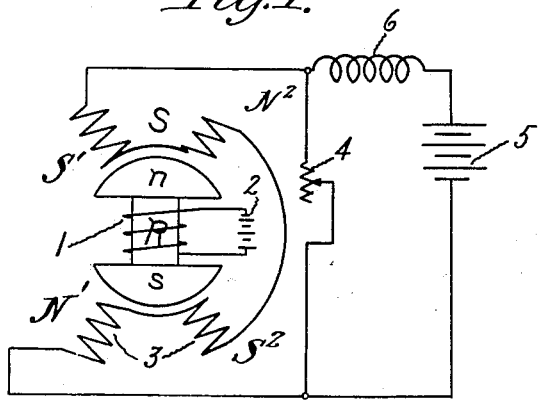
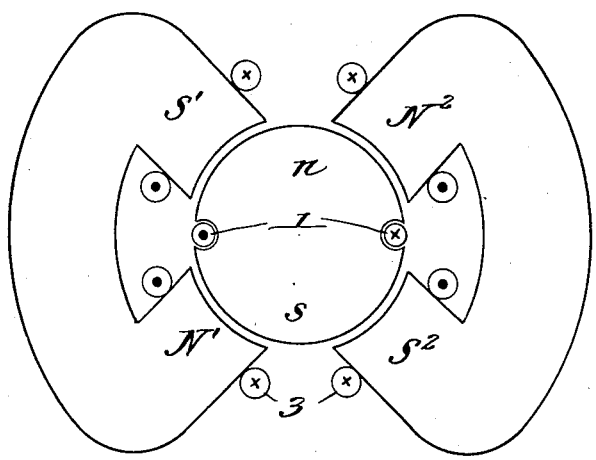
WITNESSES:
Anthony Marx.
J. Ellis Ela
INVENTOR:
MENDEL OSNOS,
BY Albert G. Davis
HIS ATTORNEY.

UNITED STATES PATENT OFFICE.

MENDEL OSNOS, OF BERLIN, GERMANY, ASSIGNOR TO GENERAL ELECTRIC COMPANY, A CORPORATION OF NEW YORK.

DYNAMO-ELECTRIC MACHINE.

1,157,325.      Specification of Letters Patent.      Patented Oct. 19, 1915.

Application filed March 8, 1913. Serial No. 752,937.

*To all whom it may concern:*

Be it known that I, MENDEL OSNOS, a subject of the Czar of Russia, residing at Berlin, Germany, have invented certain new and useful Improvements in Dynamo-Electric Machines, of which the following is a specification.

My invention relates to dynamo electric machines, and more particularly to machines for generating alternating currents.

More specifically my invention relates to synchronous machines for the generation of high frequency alternating currents of a fundamental periodicity or frequency and of a periodicity double the fundamental periodicity.

The object of my invention is to provide a dynamo electric machine which can be readily connected to deliver alternating current of a fundamental periodicity or of a periodicity double the fundamental periodicity.

A further object of my invention is to provide a machine of the character above mentioned which utilizes the principle of iron saturation for the development of alternating currents.

The novel features which I believe to be characteristic of my invention will be indicated in the claims appended hereto, the features of construction and mode of operation will be understood by reference to the following description taken in connection with the accompanying drawing, in which;

Figure 1 is a diagrammatic representation of a synchronous machine embodying the novel features of my invention, and Fig. 2 is a diagrammatic representation of the structure of the machine indicating the direction of flow of current in the various conductors thereof, the direction of the current being represented in the well known manner, by dots for current passing out of the plane of the paper toward the observer, and by crosses for current entering the plane of the paper.

In the drawings, I have illustrated a dynamo electric machine having a stator S and a rotor R. The rotor is provided with an exciting winding 1 supplied with direct current from a source 2. The exciting winding of the rotor is p-polar, where $p$ may be any desired number. In the drawing, I have shown, for the purpose of illustration, a bipolar winding and have indicated the rotor poles with appropriate reference characters $n$ and $s$.

The stator winding 3 is 2p-polar, and in the example illustrated is a four pole winding. The stator winding is connected to a work circuit 4 which is diagrammatically illustrated in the drawing as consisting of an effective or current consuming resistance. The stator winding is further arranged for connection to a source of direct current 5. A reactance 6 is included in the circuit of the direct current source and serves to exclude the alternating current induced in the stator winding from this circuit. The reactance thus selectively directs the induced alternating current and the exciting direct current flowing in the stator winding to their respective circuits.

The magnetic circuit of my improved dynamo electric machine is designed to be nearly saturated under normal operating conditions. When the machine is operating to generate frequencies of double the fundamental frequency, the magnetic circuit is worked near or on the flat portion of the saturation curve, and the operation of the machine under such conditions rests upon the utilization of the principle of iron saturation.

When the machine is arranged to produce the fundamental frequency the stator winding is changed to p-poles and is disconnected from the direct current source 5. The poles of the rotor then act to induce in the stator winding an alternating current of $$\frac{p}{2} \cdot \frac{n}{60} \text{ cycles frequency,}$$

$p$ being, as before stated, the number of poles of the rotor and $n$ the revolutions per minute of the rotor. When it is desired to generate alternating current of double the fundamental frequency, the stator winding is connected 2p-polar and excited by the direct current source 5. The rotor winding is also excited by the source 2. If the saturation of the magnetic circuit of the machine is low, no voltage will be obtained in the stator. If, however, the saturation is high there will be obtained in the stator, as can be readily demonstrated, voltages of the frequency $$p \cdot \frac{n}{60} \text{ cycles,}$$

or double the fundamental frequency.

This action will be understood from the following explanation: If the rotor is displaced in space 90° to the left of the position indicated in the drawing no reciprocal influence will take place in the pole system, since the lines of force which pass from one to the other coöperating pole of the stator do not cut the surface of the rotor winding. When the rotor moves to the position indicated in the drawing, the field is simultaneously weakened and strengthened due to the interaction of the rotor and stator poles. This will be understood by reference to the drawings where, with the members in the position indicated, the field is, by the action of the rotor, weakened in the direction $N^2 S^2$, and strengthened in the direction $N^1 S^1$. On account of the saturation of the machine, this has the result of weakening the entire field since the weakening of the field in the direction $N^2 S^2$ is much greater than the strengthening of the field in the direction $N^1 S^1$. Turning the rotor 90° farther to the right will cause the mutual influence of the pole system of the field to be again nil. Thus, while the rotor makes one-quarter of a revolution, the total field of the machine varies from a maximum to a minimum, that is, it passes through one-half a period. Thence it follows that the periodicity of the field variation in the stator and also in the rotor, in the case of a bi-polar rotor, is twice as great as the number of revolutions of the rotor, or in general terms, the periodicity of the field variation equals $$p \cdot \frac{n}{60},$$

so that not only in the stator but also in the rotor an alternating voltage of double frequency is induced. If the fundamental periodicity is desired, the stator is, as hereinbefore stated, changed to $p$ poles without exciting it with direct current, thus producing an ordinary synchronous machine.

While I have herein explained the best embodiment of my invention now known to me, it will be evident to those skilled in the art that my invention is adapted to assume other and varied forms in practice. I do not, accordingly, desire to be limited to the details of construction herein described and illustrated by way of example, but I aim in the appended claims to cover all modifications within the spirit and scope of my invention.

What I claim as new and desire to secure by Letters Patent of the United States, is,—

1. An alternating current machine comprising a rotor member and a stator member, a p-polar winding carried by one of said members and a 2p-polar winding carried by the other of said members, the magnetic circuit of said machine being designed to be normally operated near the point of saturation, and means for supplying direct current to both of said windings.

2. An alternating current generator comprising a rotor having a p-polar winding, a stator having a 2p-polar winding, the magnetic circuit of said machine being designed to be normally operated near the point of saturation, and means for supplying direct current to both of said windings.

3. An alternating current generator comprising a rotor having a p-polar winding, a stator having a 2p-polar winding, the magnetic circuit of said generator being designed to be normally operated near the point of magnetic saturation, means for supplying direct current to both of said windings, and means for connecting said stator winding to a work circuit and for selectively directing the induced alternating current and the exciting direct current flowing in the stator winding to their respective circuits.

4. An alternating current generator comprising a rotor having a p-polar winding, means for exciting said rotor winding with direct current, a stator having a winding adapted to normally have induced therein an alternating current of a fundamental frequency, the magnetic circuit of said generator being designed to be normally operated near the point of magnetic saturation, and means for exciting said stator winding with direct current and as a 2p-polar winding when it is desired to induce in said winding alternating current of double the fundamental frequency.

5. An alternating current generator comprising a stator member and a rotor member each carrying a polar winding, one of said windings being arranged to form a greater number of poles than the other, the magnetic circuit of said generator being designed to be normally operated near the point of magnetic saturation, and means for supplying direct current to each of said windings.

In witness whereof, I have hereunto set my hand this 11th day of February, 1913.

MENDEL OSNOS.

Witnesses:
 CARL DIETRICH,
 ZALTHER REINHARTH.